May 21, 1929.  E. GAMBON  1,714,359
MIXING DEVICE
Filed Sept. 12, 1928

Inventor.
EMILE GAMBON
By Victor J. Evans
Attorney.

Patented May 21, 1929.

1,714,359

UNITED STATES PATENT OFFICE.

EMILE GAMBON, OF SAN FRANCISCO, CALIFORNIA.

MIXING DEVICE.

Application filed September 12, 1928. Serial No. 305,514.

This invention relates to improvements in mixing devices and has particular reference to a device for mixing batters and the like, wherein it is necessary to combine a number of ingredients so as to have the same thoroughly mixed one with the other.

The principal object of the invention is to produce a device which may be readily transported from place to place, one which is economical to manufacture and one which is sturdy in construction.

A further object is to provide means whereby the device may be readily clamped to a chair or table so that the operator may either stand or sit while using the same.

A still further object is to produce a device whereby the device may be readily disassembled for the purpose of cleaning.

Other objects and advantages will be apparent during the course of the following description.

Figure 1:
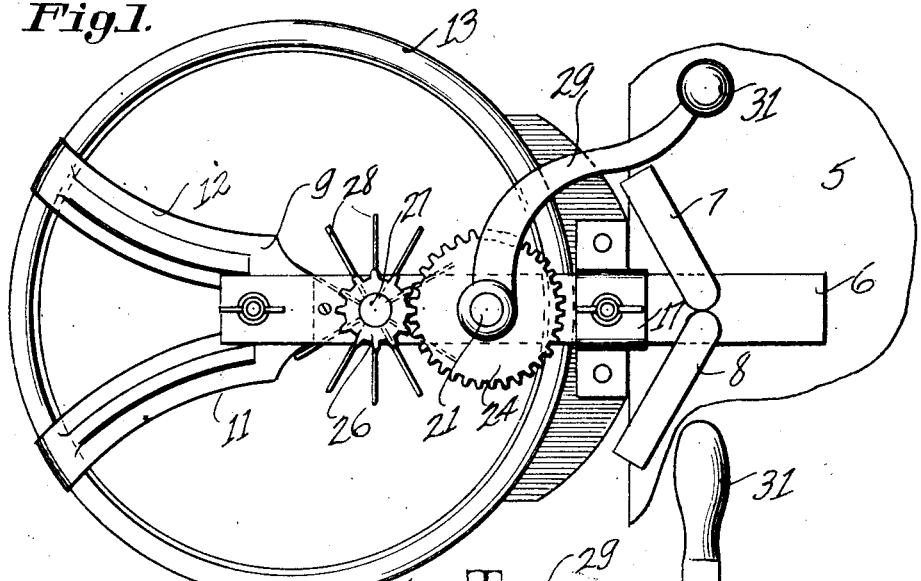

In the accompanying drawings forming a part of this specification and in which like numerals are employed to desigate like parts throughout the same, Figure 1 is a top plan view of my device as the same would appear when attached to a table.

Figure 2:
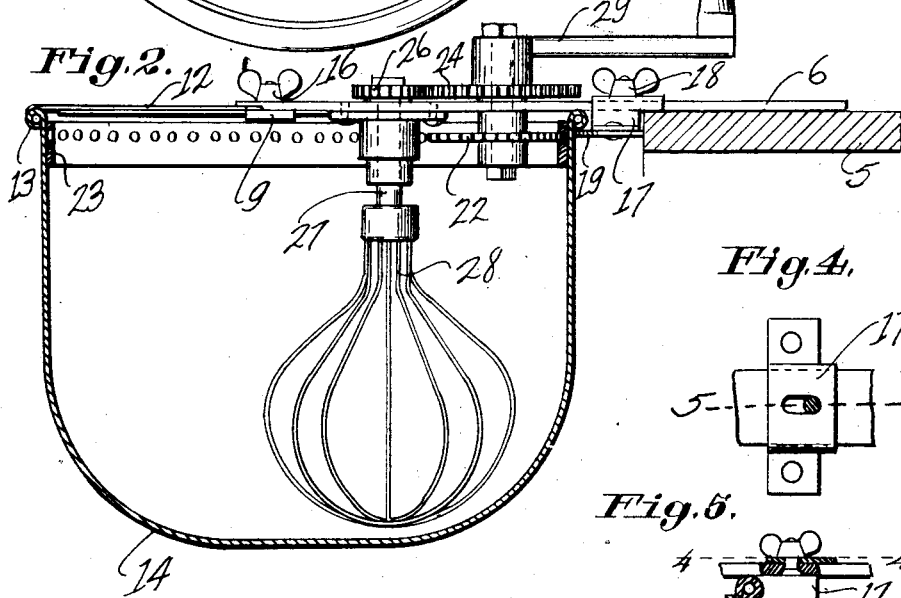
Figure 3:
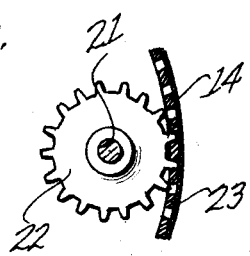
Figure 4:
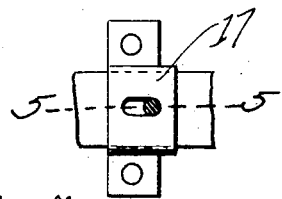
Figure 5:
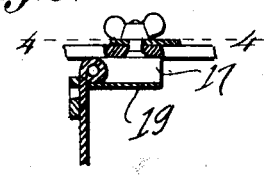

Figure 2 is a horizontal cross section of Figure 1, certain of the parts being shown in elevation, Figure 3 is a fragmentary detail view of the receptacle driving means, Figure 4 is a cross sectional view taken on the line 4—4 of Figure 5, and Figure 5 is a cross sectional view taken on the line 5—5 of Figure 4.

In the mixing of dough, batters and the like it is customary to place a number of dry ingredients in a bowl and to add a liquid thereto, after which all the ingredients are beaten together so as to procure a homogeneous mass. It has been customary to accomplish this by using a hand beater which is a very tiresome and tedious operation, particularly when the batter is heavy. Machines have been devised for accomplishing this object. These machines however, have been expensive and far beyond the average purchase price of the household user.

Applicant has therefore produced a device which will overcome the above difficulties and by referring to the drawings, the numeral 5 designates a table or other flat surface to which the brace 6 may be attached as by clamps 7 and 8. This brace 6 extends beyond a margin of the table and carries at its outer extremity a fork slide 9 having arms 11 and 12. These arms are bent so as to engage the rim 13 of the mixing bowl 14. The fork slide 9 is adjustably secured to the brace 6 by a thumb nut 16. Slidably secured upon the brace 6 is a slider 17 adjustably held by a bolt and thumb screw 18. This slider carries a plate 19 and is adapted to underlie the edge 13 of the bowl at a point diametrically from the arms 11 and 12. This construction permits the mixing bowl to be rotated with respect to the brace 6.

In order to accomplish this rotation I provide a shaft 21, which shaft extends through the brace 6 and has a gear 22 secured upon the lower extremity thereof, which gear meshes with an internal rack 23 formed upon the bowl 14. A gear 24 is also mounted upon the shaft 21 and in turn meshes with a gear 26 carried upon a shaft 27 which is mounted parallel to the shaft 21 and carrying upon its lower extremity a beater element 28. The shaft 21 is rotated through the medium of a handle of the crank lever 29 and handle 31. The result of this construction is that when the brace 6 is secured to a table or chair and the parts are assembled as shown in the drawings, rotation of the handle 31 will impart rotation to the shaft 21 and the gears connected thereto. The gear 24 will rotate the beating element in a reverse direction from that of the bowl, while the gear 22 will cause the bowl to rotate in the same direction that the handle is being rotated, but of course at a slower speed.

When the mixing operation has been completed, the thumb nuts 16 and 18 may be loosened and the bolt removed. If desired the brace 6 may be extended and provided with a seat plate so that the operator can place the brace upon the seat of a chair and sit thereon thus holding the bowl between the knees where it may be readily operated during mixing.

It is to be understood that the form of my invention herewith shown and described is to be taken as a preferred example of the same and that various changes relative to the material, size, shape and arrangement of parts may be restored to without departing from the spirit of the invention or the scope of the subjoined claims.

Having thus described my invention, I claim:—

1. In a device of the character described, a brace, a slider carried on said brace, a plate carried by said slider, a fork member slidably secured to said brace, said fork member having arms provided with downturned ends, a bowl slidably held by said downturned ends and said plate, a pair of parallel spaced shafts extending through said brace, means for rotating one of said shafts, gears positioned between said shafts, said gears meshing with each other, one of said gears being adapted to rotate said bowl and a beating element carried on the other of said shafts from said turning means for the purpose specified.

2. In a mixing device, a bowl having a flared upper extremity, means for supporting said bowl, said means comprising a brace having a slider positioned thereon, a plate carried by said slider and underlying said flared extremity of said bowl, a fork member carried by said support, arms carried by said fork member, said arms having downturned ends engaging the flared extremity of said bowl, an internal gear carried on said bowl, a shaft extending through said brace, means for rotating said shaft, a gear positioned on said shaft and meshing with said internal gear, a second shaft extending through said brace, a gear positioned thereon and engaging a second gear positioned on said first mentioned shaft and a beating element carried on said second mentioned shaft for the purpose specified.

In testimony whereof I affix my signature.

EMILE GAMBON.